Patented Apr. 7, 1942

2,278,634

UNITED STATES PATENT OFFICE 2,278,634

RESINS COMPRISING THE ACRYLIC AND METHACRYLIC ACID ESTERS OF THE HYDROXYBIPHENYLS

Carl E. Barnes, Worcester, Mass., assignor, by mesne assignments, to E. I. du Pont de Nemours & Company, Wilmington, Del., a corporation of Delaware No Drawing. Application August 1, 1938, Serial No. 222,539

7 Claims. (Cl. 260—83)

This invention relates to synthetic resins and especially to resins comprising esters of acrylic acid and alpha substituted acrylic acids.

There is a commercial need for a synthetic resin having certain desirable properties, such as a high softening point, moldability, hardness, tensile strength, resistance to abrasion, transparency, a refractive index within desired limits and the ability to be ground and to take a high polish.

The primary object of this invention is to provide a resin having such desired properties and which in particular has a sufficiently high softening point and strength that it may be used in many commercial industries, such as a bond for granular materials or as a molded article.

Another object is to provide a synthetic resin, which is transparent and substantially colorless, which may be shaped by a grinding and polishing operation to provide a smooth optical surface and which has a high refractive index.

A further object is to provide a copolymerized resin made of a base substance and a modifying agent of the types herein described which give desired physical and optical properties.

Specific objects of the invention are to make the biphenyl acrylates and methacrylates and to provide polymerized resins comprising the same. Other objects will be apparent in the following disclosure.

In accordance with my invention, I produce the monomeric acrylic and methacrylic acid esters of the mono- and poly-hydroxybiphenyls by the method described and I polymerize the same to form hard transparent resins capable of use in many arts. I have also discovered that such substances may be copolymerized with various base substances and with agents which serve to modify the physical and optical properties thereof, such as the hardness or softening point and the refractive index, and thus provide bodies which are especially adapted for many purposes.

These acrylates and methacrylates and the esters of hydroxybiphenyl or phenyl phenol in which one hydroxyl group may be substituted in the ortho-, meta- or para-positions of the benzene rings, or in which two hydroxyl groups may be substituted in any two of the positions of either or both rings. Similarly, three or more hydroxyl groups may be substituted in any of the ten positions indicated.

The methacrylic acid esters of the mono-hydroxybiphenyls may be prepared as follows, using the ortho-compound as an example:

The monomer is formed by mixing 0.12 mol (34 grams) of ortho-hydroxybiphenyl with 0.2 mol (30.8 grams) of methacrylic anhydride and 0.2 mol (15.8 grams) of pyridine, together with an inhibitor, such as one-half gram of copper methacrylate. This mixture, which becomes warm upon the addition of pyridine, is allowed to stand for 24 hours, and then about 30 ccs. of dilute 6n $H_2SO_4$ is added. Ether (200 ccs.) is then added and the mixture is shaken well. The ether solution is then extracted several times with dilute $H_2SO_4$ to remove the pyridine. It is then extracted several times with dilute NaOH to remove the methacrylic acid that has been formed. The substance is then washed with water several times. Then the ether solution of the product is dried by means of anhydrous $Na_2SO_4$, after which the ether is removed by the application of reduced pressure. This leaves as a final product a pale yellow oil, which is the impure methacrylic acid ester of ortho-hydroxybiphenyl or ortho-xenyl methacrylate. The material may be purified by distillation, with the addition of copper methacrylate to serve as an inhibitor. The other acrylates and methacrylates may be made by similar methods, as will be readily understood.

The monomeric methacrylic acid ester of ortho-hydroxybiphenyl may be polymerized by heating it at 50° to 100° C. with or without a catalyst, such as benzoyl peroxide. It polymerizes to a transparent, substantially colorless, solid mass having an index of refraction of 1.618 for the sodium line. The boiling point of the monomeric liquid is 298° to 300° C. This material is comparatively hard and highly resistant to abrasion, and it has such physical characteristics that it may be shaped by grinding and polishing operations to provide a highly polished surface. The polymer may also be shaped by heating the polymerized material in a mold to soften the same and cause it to assume the contour of the mold. The monomer may be polymerized in a mold to a desired shape. Hence, the material has highly desirable properties for optical purposes, and it may be shaped as prisms or lenses for use in spectacles or various optical instruments.

These mono-hydroxybiphenyl esters of methacrylic acid may be polymerized in the presence of granular material, such as abrasive grains, to bond the same. In this case, a satisfactory method of making such an article comprises placing in a mold the desired granular material, such as silicon carbide, crystalline alumina, boron carbide or diamond granules, then pouring the liquid monomeric substance into the mold to fill the pore cavities and thereafter heating it, with or without a catalyst, in order to polymerize the substance in the presence of the grains and form a hard body containing the same. This bonded article has various uses, such as for grinding and abrasive purposes.

The refractive indices of the polymers are very high and they may be copolymerized with other compatible substances of lower index to obtain a resin of intermediate index. For example, methyl methacrylate has a refractive index of about 1.49 and it may be copolymerized with the o-hydroxybiphenyl ester (having an index of 1.618) to give a copolymer having an index intermediate between those of the two substances employed, depending upon the relative amounts of the same. A copolymer of vinyl acetate and vinyl chloride will provide an index of 1.465. Hence, a proper combination of these substances with the biphenyl esters of acrylic or methacrylic acid will give various intermediate indices and provide bodies of utility in the optical field.

I accordingly propose to make various synthetic resins by copolymerizing the biphenyl methacrylates with a base substance which is a polymerizable vinyl or substituted vinyl compound, such as styrene, vinyl acetate, vinyl chloride, methyl vinyl ketone or a polymerizable acrylic acid derivative and particularly an ester of acrylic acid or methacrylic acid, such as methyl methacrylate.

I may also add a hardness improving agent to the combination of the base substance and any of the biphenyl methacrylates and thereby increase such properties as strength, resistance to abrasion and grindability and/or raise the softening temperature. As examples of such hardness improving agents, I may use acrylic acid or methacrylic acid, or a substance which contains at least two polymerizable unsaturated methylene groups per molecule, such as the anhydride of acrylic or methacrylic acid or the esters thereof with allyl alcohol or polyhydric alcohols, such as ethylene glycol, diethylene glycol, triethylene glycol, tetraethylene glycol, glycerol, pentaglycerol, pentaerythritol, trimethylolpropane, trimethyleneglycol and similar polyhydric alcohols.

Some of the modifying agents are able to serve as cross linking agents and thus make a three dimensional growth of the copolymer by establishing cross linkages between the linear chains produced by the primary or the base substance. This cross linkage, therefore, tends to raise the softening point and to make the substance less mobile and therefore to improve its hardness. I may use various combinations of these materials so that I may modify not only the hardness or the refractive index but various other properties. The proportions of the monomeric substance employed to make the copolymer may be varied within the limits of miscibility and the production of a body of useful and desirable properties.

As an example of a resin of copolymerized substances, I may use 40% by volume of methyl methacrylate, 40% of the methacrylic acid ester of ortho-hydroxybiphenyl and 20% of methacrylic acid and thereby form a colorless resin which is hard and may be shaped by a grinding operation to provide a polished surface useful for optical purposes. A further example involves using 50% of methyl methacrylate, 40% of the methacrylic acid ester of ortho-hydroxybiphenyl and 10% of ethylene glycol dimethacrylate, and the copolymer has similarly desirable optical properties. These substances may be used in other desired proportions, within the range of miscibility of the monomers and their polymerization to a body of a homogeneous structure.

The resins made of the biphenyl methacrylates polymerized with any of the base substances and any of the modifying agents above specified have various other desired properties, such as being very light in weight and having high elasticity and strength. They have high enough softening points and are sufficiently resistant to abrasion under normal temperature conditions as to be useful as molded articles in many fields of utility. Their transparency and ability to be shaped by grinding makes them particularly useful as optical bodies, and particularly since they may be so combined as to satisfy the requirements not only of refractive index but also of dispersion and other optical properties.

Instead of the univalent xenyl esters or the methacrylic acid esters of mono-hydroxy biphenyls mentioned in the above examples, I may use the methacrylic acid esters of the polyhydroxy biphenyls, for example, the ester of para, para prime, di-hydroxy biphenyl:

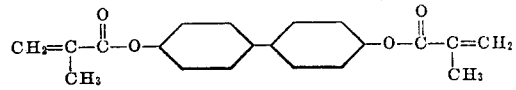

These esters, which have more than one polymerizable group per molecule, serve not only as agents for modifying the refractive index but also as hardening (cross linking) agents. Such cross linking esters, when polymerized with the base substances, form transparent bodies of higher softening points and increased hardness. When polymerized alone, they form infusible, insoluble, transparent bodies of high refractive indices.

Also, instead of the methacrylic acid esters, I may use the esters of a mono- or poly-hydroxy biphenyl with acrylic acid. The polymers formed therefrom may be used either separately for the above defined purposes, or they may be copolymerized with any of the above mentioned base substances and agents for the purposes specified.

It will, therefore, be understood that the above description is to be considered as illustrative of the general scope of the invention and not as limiting it to the specific compounds mentioned, and the claims are to be interpreted accordingly.

I claim:

1. A hydroxybiphenyl ester of an acid from the group consisting of acrylic and methacrylic acids.
2. A xenyl ester of an acid from the group consisting of acrylic and methacrylic acids.
3. Xenyl acrylate.
4. Xenyl methacrylate.
5. A resin formed of a polymerized substance including a hydroxybiphenyl ester of an acid from the group consisting of acrylic and methacrylic acids.
6. A resin formed of a polymerized substance including a hydroxybiphenyl ester of methacrylic acid.
7. A resin formed of copolymerized substances including a hydroxybiphenyl ester of methacrylic acid and methyl methacrylate.

CARL E. BARNES.

CERTIFICATE OF CORRECTION.

Patent No. 2,278,634.　　　　　　　　　　　　April 7, 1942.

CARL E. BARNES.

It is hereby certified that error appears in the printed specification of the above numbered patent requiring correction as follows: Page 2, first column, lines 27 and 36, for "methacrylates" read --esters of acrylic or methacrylic acid--; and that the said Letters Patent should be read with this correction therein that the same may conform to the record of the case in the Patent Office.

Signed and sealed this 9th day of June, A. D. 1942.

(Seal)

Henry Van Arsdale,
Acting Commissioner of Patents.